United States Patent
Li et al.

(10) Patent No.: US 11,075,729 B2
(45) Date of Patent: Jul. 27, 2021

(54) PILOT MAPPING METHOD, PILOT SIGNAL TRANSMISSION METHOD AND APPARATUS, BASE STATION AND TERMINAL

(71) Applicant: CHINA ACADEMY OF TELECOMMUNICATIONS TECHNOLOGY, Beijing (CN)

(72) Inventors: Hui Li, Beijing (CN); Qiubin Gao, Beijing (CN); Runhua Chen, Beijing (CN); Wenhong Chen, Beijing (CN); Rakesh Tamrakar, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 168 days.

(21) Appl. No.: 16/090,180

(22) PCT Filed: Mar. 31, 2017

(86) PCT No.: PCT/CN2017/078979
§ 371 (c)(1),
(2) Date: Sep. 28, 2018

(87) PCT Pub. No.: WO2017/167263
PCT Pub. Date: Oct. 5, 2017

(65) Prior Publication Data
US 2019/0116075 A1   Apr. 18, 2019

(30) Foreign Application Priority Data
Mar. 31, 2016   (CN) .................. 201610200775.2

(51) Int. Cl.
*H04L 5/00*   (2006.01)
*H04W 72/04*   (2009.01)
(Continued)

(52) U.S. Cl.
CPC ........ *H04L 5/0048* (2013.01); *H04J 13/0003* (2013.01); *H04L 5/005* (2013.01);
(Continued)

(58) Field of Classification Search
CPC ... H04L 5/0007; H04L 5/0051; H04L 5/0048; H04L 5/0016–0023;
(Continued)

(56) References Cited

U.S. PATENT DOCUMENTS

| 2013/0044727 | A1* | 2/2013 | Nory | .................. H04L 5/0092 370/330 |
| 2014/0198675 | A1* | 7/2014 | He | ...................... H04L 5/14 370/252 |

(Continued)

FOREIGN PATENT DOCUMENTS

| CN | 104993911 A | 10/2015 |
| CN | 105075144 A | 11/2015 |

(Continued)

OTHER PUBLICATIONS

Extended European Search Report from EP app. No. 17773293.0, dated Mar. 19, 2019.
(Continued)

*Primary Examiner* — Joshua Kading
(74) *Attorney, Agent, or Firm* — Ladas & Parry, LLP

(57) ABSTRACT

The present disclosure provides a pilot mapping method, a pilot signal transmission method and apparatus, a base station and a terminal. In each PRB of one PRB group, the positions at which a pilot of each antenna port is mapped to resource elements (RE) in the PRB is determined according to an antenna port index and an index of the PRB in the PRB group or the whole system bandwidth, so that support is provided for implementation of power borrowing, so as to make full use of transmit power of a base station end,
(Continued)

improve the coverage range of the pilot signal and channel estimation quality of a reception end.

17 Claims, 7 Drawing Sheets

(51) Int. Cl.
  *H04W 16/02* (2009.01)
  *H04J 13/00* (2011.01)
(52) U.S. Cl.
  CPC .......... *H04L 5/0016* (2013.01); *H04L 5/0026* (2013.01); *H04W 16/02* (2013.01); *H04W 72/042* (2013.01); *H04W 72/044* (2013.01); *H04W 72/0493* (2013.01); *H04J 13/004* (2013.01)
(58) Field of Classification Search
  CPC .......... H04L 5/0037–0041; H04L 5/005; H04L 5/0026; H04L 5/0023; H04L 27/2611; H04L 27/2613; H04J 13/0003; H04J 13/004; H04J 13/10; H04J 2013/0088; H04J 2013/165; H04J 2014/0016; H04W 16/02; H04W 72/042; H04W 72/044; H04W 72/0493
  See application file for complete search history.

(56) References Cited

U.S. PATENT DOCUMENTS

| | | | | |
|---|---|---|---|---|
| 2015/0063281 A1* | 3/2015 | Xu | ........................ | H04L 5/0051 370/329 |
| 2015/0146670 A1* | 5/2015 | Liu | ........................ | H04L 5/0007 370/329 |
| 2015/0181569 A1* | 6/2015 | Kim | ........................ | H04B 7/0413 370/329 |
| 2015/0189634 A1* | 7/2015 | Wang | ........................ | H04L 5/0053 370/329 |
| 2015/0229455 A1* | 8/2015 | Seo | ........................ | H04L 5/0007 370/329 |
| 2017/0078006 A1* | 3/2017 | Liu | ........................ | H04L 27/2613 |
| 2017/0222768 A1 | 3/2017 | Lee et al. | | |
| 2017/0105112 A1* | 4/2017 | Park | ........................ | H04W 8/005 |
| 2018/0007574 A1* | 1/2018 | Park | ........................ | H04W 72/042 |
| 2019/0364549 A1* | 11/2019 | Kim | ........................ | H04L 5/0048 |

FOREIGN PATENT DOCUMENTS

| | | |
|---|---|---|
| EP | 2579664 A1 | 10/2013 |
| WO | 2016039586 A1 | 3/2016 |
| WO | 2016122257 A1 | 8/2016 |

OTHER PUBLICATIONS

Written Opinion of the International Searching Authority from PCT/CN2017/078979, dated May 31, 2017, with English translation from WIPO.
International Preliminary Report on Patentability, from PCT/CN2017/078979, dated Oct. 2, 2018, with English translation from WIPO.
International Search Report for PCT/CN2017/078979 dated May 31, 2017 and its English translation provided by WIPO.
Written Opinion of the International Search Authority PCT/CN2017/078979 dated May 31, 2017 and its English translation provided by Google Translate.

* cited by examiner

PILOT MAPPING METHOD, PILOT SIGNAL TRANSMISSION METHOD AND APPARATUS, BASE STATION AND TERMINAL

CROSS-REFERENCE TO RELATED APPLICATION

This application is the U.S. national phase of PCT Application No. PCT/CN2017/078979 filed, on Mar. 31, 2017 which is based on and claims priority to Chinese Patent Application No. 201610200775.2, filed on Mar. 31, 2016, the disclosures of which are incorporated herein by reference.

TECHNICAL FIELD

The present disclosure relates to the field of wireless communication and channel quality measurement technologies, and in particular to a pilot mapping method for antenna ports, a pilot signal transmission method and apparatus, a base station and a terminal.

BACKGROUND

In 3GPP Rel-10 long term evolution (LTE) system, a channel state indication-reference signal (CSI-RS) is introduced and taken as measurement pilot. The measurement pilot may be configured as a 2-port or 4-port or 8-port pilot pattern. In one physical resource block (PRB), there are 20 groups of 2-port pilot patterns, 10 groups of 4-port pilot patterns and 5 groups of 8-port pilot patterns.

In the LTE system in the related art, in one sub-frame containing CSI-RS, each PRB in the whole system bandwidth usually uses the same pilot pattern, thus, the mapping of the antenna port is simpler, and a more complex pilot mapping mode cannot be realized.

SUMMARY

The present disclosure provides a pilot mapping method for antenna ports, a pilot signal transmission method and apparatus, a base station and a terminal, which can realize complex pilot mapping mode.

One embodiment of the present disclosure provides a pilot mapping method for antenna ports that include K antenna port groups each including no more than N antenna ports. The pilot mapping method includes: grouping physical resource blocks (PRBs) in a wireless communication system bandwidth in the frequency domain, thereby obtaining a plurality of PRB groups each including M PRBs, where M is an integer multiple of K; in each PRB of one PRB group, determining positions at which a pilot of each antenna port is mapped to resource elements (RE) in the PRB according to an antenna port index and an index of the PRB in the PRB group or the whole system bandwidth, thereby obtaining pilot mapping in the PRB group; and reusing the pilot mapping in the PRB group to each PRB group in the system bandwidth.

Optionally, in the above pilot mapping method, the grouping physical resource blocks in the wireless communication system bandwidth in the frequency domain includes: grouping every M PRBs that are continuous in the frequency domain in the system bandwidth into one group.

Optionally, in the above pilot mapping method, K groups of N-port pilot patterns are mapped in each PRB; when in each PRB of one PRB group, determining the positions at which the pilot of each antenna port is mapped to the resource elements in the PRB according to the antenna port index and the index of the PRB in the PRB group or the whole system bandwidth, each antenna port of the same antenna port group is mapped to more than two groups of N-port pilot patterns in the PRB group; and for each antenna port group, in each PRB of the PRB group, a sum of the quantity of the N-port pilot patterns contained in the OFDM symbols where each antenna port group is located is the same.

Optionally, in the above pilot mapping method, the same K groups of N-port pilot patterns are mapped in each PRB of the PRB group; each antenna port group is mapped to an RE position where a different N-port pilot pattern is mapped to; each antenna port of the antenna port group is multiplexed on all RE positions where the N-port pilot pattern is mapped to. The determining the positions at which the pilot of each antenna port is mapped to the resource elements in the PRB includes: determining one antenna port group to which each antenna port belongs, according to the antenna port index; determining N-port pilot patterns that are mapped by each antenna port of each antenna port group sequentially in each PRB of the PRB group according to the index of the PRB in the PRB group, enabling each antenna port group to traverse integer times for the K groups of N-port pilot patterns in the PRB group with the quantity of times of traversing of each antenna port group being the same, thereby obtaining a pilot pattern for the PRB group.

Optionally, in the above pilot mapping method, different K groups of N-port pilot patterns are mapped in different PRBs of the PRB group; each antenna port group is mapped to RE positions where different N-port pilot patterns are mapped to; each antenna port of the antenna port group is multiplexed on all RE positions where the N-port pilot frequency patterns are mapped to. The determining the positions at which the pilot of each antenna port is mapped to the resource elements in the PRB according to an antenna port index and an index of the PRB in the PRB group or the whole system bandwidth includes: determining one antenna port group to which each antenna port belongs, according to the antenna port index; configuring an aggregated pilot pattern group for the first PRB of the PRB group, wherein the pilot pattern group includes K groups of N-port pilot patterns; determining an N-port pilot pattern mapped by each antenna port group in the first PRB; and determining a first sequence defined by the quantity of the N-port pilot patterns contained in the OFDM symbols where each antenna port group is located in the first PRB.

Optionally, in the above pilot mapping method, when the quantity of PRBs in the bandwidth of the wireless communication system is not an integer multiple of M, the method further includes: determining remaining PRBs after the PRBs are grouped, and according to the quantity of the remaining PRBs, selecting the same quantity of PRBs from the PRB group, and adopting the pilot mapping of the same quantity of PRBs for the remaining PRBs.

One embodiment of the present disclosure provides a pilot signal transmission method for transmitting a pilot signal obtained through the above pilot mapping method. The pilot signal transmission method includes: generating pilot configuration information that indicates RE positions corresponding to the pilot signal; and transmitting the pilot signal to a terminal, and transmitting the pilot configuration information to the terminal, thereby enabling the terminal to receive the pilot signal according to the pilot configuration information.

One embodiment of the present disclosure provides another pilot signal transmission method for transmitting a pilot signal obtained through the above pilot mapping method. The pilot signal transmission method includes: receiving, from a base station, pilot configuration information that indicates an RE position corresponding to a pilot signal; and receiving and measuring the pilot signal transmitted from the base station according to the pilot configuration information.

One embodiment of the present disclosure provides a pilot mapping apparatus for antenna ports that include K antenna port groups each including no more than N antenna ports. The pilot mapping apparatus includes: a grouping unit configured to group physical resource blocks (PRBs) in a wireless communication system bandwidth in a frequency domain, thereby obtaining a plurality of PRB groups each including M PRBs, where M is an integer multiple of K; a mapping determination unit configured to, in each PRB of one PRB group, determine the positions at which a pilot of each antenna port is mapped to resource elements (RE) in the PRB according to an antenna port index and an index of the PRB in the PRB group or the whole system bandwidth, thereby obtaining pilot mapping in the PRB group; and a multiplexing unit configured to reuse the pilot mapping in the PRB group to each PRB group in the system bandwidth.

Optionally, in the above pilot mapping apparatus, the grouping unit is specifically configured to group every M PRBs that are continuous in the frequency domain in the system bandwidth into one group.

Optionally, in the above pilot mapping apparatus, each PRB is mapped to K groups of N-port pilot patterns; the multiplexing unit is configured to, when in each PRB of one PRB group, determining the positions at which the pilot of each antenna port is mapped to the resource elements in the PRB according to the antenna port index and the index of the PRB in the PRB group or the whole system bandwidth, enable each antenna port of the same antenna port group to be mapped to more than two groups of N-port pilot patterns in the PRB group; and enable a sum of the quantity of the N-port pilot patterns contained in the OFDM symbols, which is in each PRB of the PRB group and in which each antenna port group is located, to be the same.

Optionally, in the above pilot mapping apparatus, the same K groups of N-port pilot patterns are mapped in each PRB of the PRB group; each antenna port group is mapped to an RE position where different N-port pilot patterns are mapped to; each antenna port of the antenna port group is multiplexed on all RE positions where the N-port pilot frequency patterns are mapped to. The mapping determination unit includes: a port group determining sub-unit configured to determine one antenna port group to which each antenna port belongs, according to the antenna port index; and a first traversing sub-unit configured to, determine N-port pilot patterns that are mapped by each antenna port of each antenna port group sequentially in each PRB of the PRB group according to the index of the PRB in the PRB group, enable each antenna port group to traverse integer times for the K groups of N-port pilot patterns in the PRB group with the quantity of times of traversing of each antenna port group being the same, thereby obtaining the pilot pattern for the PRB group.

Optionally, in the above pilot mapping apparatus, different K groups of N-port pilot patterns are mapped in different PRBs of the PRB group; each antenna port group is mapped to an RE position where different N-port pilot patterns are mapped to; each antenna port of the antenna port group is multiplexed on all RE positions where the N-port pilot frequency patterns are mapped to. The mapping determination unit includes: a port group determining sub-unit configured to determine one antenna port group to which each antenna port belongs, according to the antenna port index; a configuration sub-unit configured to, configure an aggregated pilot pattern group for the first PRB of the PRB group, wherein the pilot pattern group includes K groups of N-port pilot patterns; determine an N-port pilot pattern mapped by each antenna port group in the first PRB; and determine a first sequence defined by the quantity of the N-port pilot patterns contained in the OFDM symbols where each antenna port group is located in the first PRB; and a second traversing sub-unit configured to, according to the index of the PRB in the PRB group, sequentially determine pilot pattern groups for remaining PRBs in the PRB group, and determine N-port pilot patterns that are mapped by each antenna port of each antenna port group; enable each antenna port group to traverse all values in the first sequence for integer times according to the quantity of N-port pilot patterns contained in the OFDM symbols where each antenna port group is located in each PRB of the PRB group, with the quantity of times of traversing performed by each antenna port group being the same, thereby obtaining the pilot pattern for the PRB group.

Optionally, the above pilot mapping apparatus further includes an additional mapping unit configured to, when the quantity of PRBs in the bandwidth of the wireless communication system is not an integer multiple of M, determine remaining PRBs after the PRBs are grouped; according to the quantity of the remaining PRBs, select the same quantity of PRBs from the PRB group, and adopt the pilot mapping of the same quantity of PRBs for the remaining PRBs.

One embodiment of the present disclosure provides a base station for transmitting a pilot signal obtained through the above pilot mapping method. The base station includes: a generation unit configured to generate pilot configuration information that indicates RE positions corresponding to the pilot signal; and a transmission unit configured to transmit the pilot signal to a terminal, and transmit the pilot configuration information to the terminal, thereby enabling the terminal to receive the pilot signal according to the pilot configuration information.

One embodiment of the present disclosure provides a terminal for transmitting a pilot signal obtained through the above pilot mapping method. The terminal includes: a first receiving unit configured to receive, from a base station, pilot configuration information that indicates an RE position corresponding to a pilot signal; and a second receiving unit configured to receive and measure the pilot signal transmitted from the base station according to the pilot configuration information.

One embodiment of the present disclosure provides a pilot mapping apparatus for antenna ports that include K antenna port groups each including no more than N antenna ports. The pilot mapping apparatus includes: a processor and a memory coupled to the processor through a bus interface. The memory is configured to store programs and data used by the processor when performing operations. When the processor calls and executes the programs and data stored in the memory, the processor is configured to, group physical resource blocks (PRBs) in a wireless communication system bandwidth in a frequency domain, thereby obtaining a plurality of PRB groups each including M PRBs, where M is an integer multiple of K; in each PRB of one PRB group, determine the positions at which a pilot of each antenna port is mapped to resource elements (RE) in the PRB according to an antenna port index and an index of the PRB in the PRB group or the whole system bandwidth, thereby obtaining pilot mapping in the PRB group; and reuse the pilot mapping in the PRB group to each PRB group in the system bandwidth.

One embodiment of the present disclosure provides a base station for transmitting a pilot signal obtained through the above pilot mapping method. The base station includes: a processor, a transceiver and a memory. The processor is configured to read programs in the memory and perform operations including: generating pilot configuration information that indicates RE positions corresponding to the pilot signal; controlling the transceiver to transmit the pilot signal to a terminal, and transmitting the pilot configuration information to the terminal, thereby enabling the terminal to receive the pilot signal according to the pilot configuration information. The transceiver is configured to receive and transmit data under control of the processor. The memory is configured to store data used by the processor when performing the operations.

One embodiment of the present disclosure provides a terminal for transmitting a pilot signal obtained through the above pilot mapping method. The terminal includes: a processor, a transceiver and a memory. The processor is configured to read programs in the memory and perform operations including: receiving, from a base station, pilot configuration information that indicates an RE position corresponding to a pilot signal, receiving and measuring the pilot signal transmitted from the base station according to the pilot configuration information. The transceiver is configured to receive and transmit data under control of the processor. The memory is configured to store data used by the processor when performing the operations.

The pilot mapping method for antenna ports, the pilot signal transmission method and apparatus, the base station and the terminal of embodiments of the present disclosure enables one antenna port is mapped to more than two N-port pilot patterns in frequency domain, and the one antenna port is not always mapped to the same N-port pilot pattern. In addition, embodiments of the present disclosure can provide support for power borrowing and then make full use of the transmission power at the base station end, improve a coverage range of the pilot signal and the channel estimation quality of the reception end.

DETAILED DESCRIPTION

In order to make technical solutions and advantages of the present disclosure more clear, detailed description will be described hereinafter in conjunction with accompanying drawings and embodiments. In the following description, specific details such as specific configurations and components are provided only to assist in a comprehensive understanding of the embodiments of the present disclosure. It will be apparent to those skilled in the art that various changes and modifications may be made to the embodiments described herein without departing from the scope and spirit of the present disclosure. In addition, descriptions of well-known functions and constructions are omitted for clarity and conciseness.

It should be understood that, "an embodiment" mentioned throughout the specification means as follows. A specific feature, structure or characteristic related with the embodiment is included by at least one embodiment of the present disclosure. Thus, "in an embodiment" throughout the whole specification does not necessarily refer to the same embodiment. In addition, these specific features, structures or characteristics may be combined into one or more embodiments in any appropriate manner.

In various embodiments of the present disclosure, it should be understood that, number sequence of each foregoing process does not mean order of execution. The order of execution of each process should be determined by function and internal logic thereof, instead of making any limitation to implementation process of embodiments in the present disclosure.

In addition, terms "system" and "network" in the present disclosure may be exchanged for use.

It should be understood that, the term "and/or" in the present disclosure only describes a relation of an associated object, which denotes that three relationships may exist, e.g., A and/or B may demonstrate three scenes of: A exists independently, A and B exist simultaneously, B exists independently. In addition, the character"/" in the present disclosure generally refers to that, there is a "or" relationship between two adjacent associated objects.

In the embodiments provided by the present disclosure, it should be understood that, "B corresponds to A" refers to as follows. B is related with A, and B may be determined based on A. It should also be understood that, determining B based on A does not mean to determine B only based on A, B may be determined based on A and/or other information.

In the LTE system in the related art, each PRB in the whole system bandwidth usually uses the same pilot pattern, thus, the mapping of the antenna port is simpler. This simple mapping mode sometimes may lead to a big difference between pilot signal powers of different antenna ports. FIG.

Figures 1A, 1B, 1C:
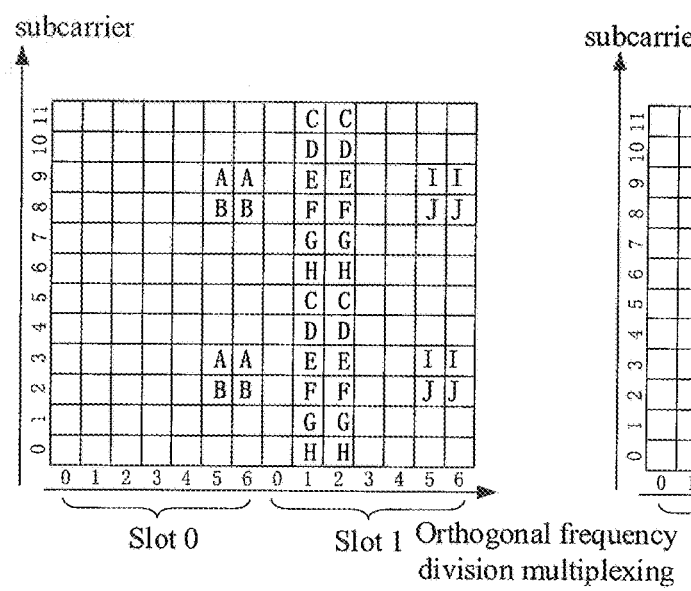
FIG. 1A to FIG. 1C show 2-port CSI-RS pilot pattern, 4-port CSI-RS pilot pattern and 8-port CSI-RS pilot pattern of the LTE system in the related art, respectively.

1A to FIG. 1C show CSI-RS pilot patterns supported by the LTE system in the related art. FIG. 1A to FIG. 1C show 2-port CSI-RS pilot pattern, 4-port CSI-RS pilot pattern and 8-port CSI-RS pilot pattern, respectively. In FIG. 1A, adjacent two resource elements (REs) indicated by "0 1" represent one set of pilots. In FIG. 1B and FIG. 1C, REs with the same filling pattern represent one set of pilots. For example, in FIG. 1A, adjacent two REs indicated by "0" and "1" indicates that 2-port CSI-RS is multiplexed on these two REs. In FIG. 1B, four REs that are indicted by "0", "1", "2" and "3" and are filed with the same filling pattern, indicate that 4-port CSI-RS is multiplexed on these four REs. Similarly, in FIG. 1C, 8-port CSI-RS is multiplexed on one set of REs. Every two ports use code division multiplexing on adjacent two REs, for example, in FIG. 1A, adjacent two REs indicated by "0" and "I" multiplexes a port 0 and a port 1, which are multiplexed with (1, 1) and (1, −1), and this multiplexing mode may be expressed as an orthogonal coverage code (OCA)=2.

Figures 2A, 2B:
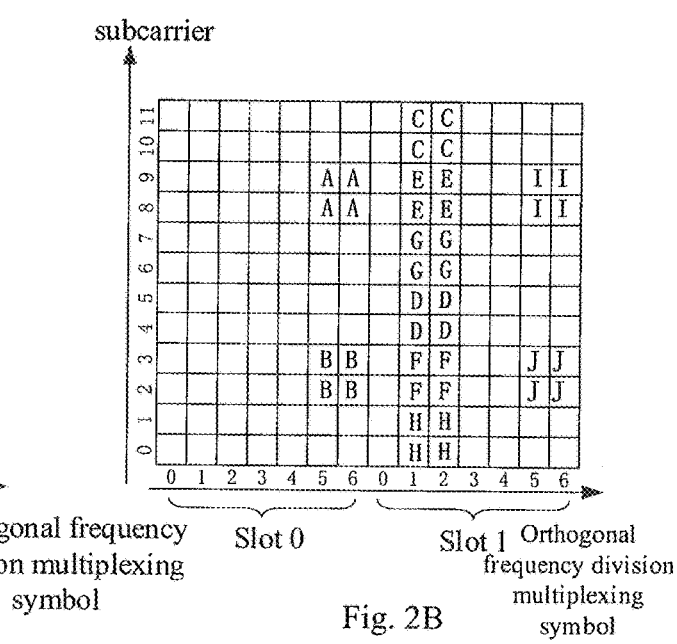
FIG. 2A and FIG. 2B show 12-port CSI-RS pilot pattern and 16-port CSI-RS pilot pattern of the LTE system in the related art, respectively.

Bases on this, 12-port measurement pilot and 16-port measurement pilot are introduced in 3GPP Rel-13 version, and are generated through port aggregation. Meanwhile, in order to obtain better power utilization, an OCC=4 mode is introduced on the basis of the orthogonal coverage code OCC=2 in Rel-10. In this way, 12 ports may be obtained through aggregation of three 4-port CSI-RS (by multiplexing with OCC=2 or OCC=4) and 16 ports may be obtained through aggregation of two 8-port CSI-RS (by multiplexing with OCC=2 or OCC=4), which are respectively shown in FIG. 2A and FIG. 2B. The same letter parts in FIG. 2A and FIG. 2B form a group with OCC=4, each group adopts time division multiplexing (TDM) and frequency division multiplexing (FDM), and CSI-RS of four ports are multiplexed on four REs of each group.

For each PRB, when a quantity of CSI-RS pilot signals contained in each orthogonal frequency division multiplexing (OFDM) symbol is different, a quantity of CSI-RS pilot signals contained in each OFDM symbol in the whole system bandwidth is also different. This will lead to inconsistency in transmission powers of CSI-RS pilot signals of different antenna ports.

For example, for 12-port CSI-RS pilot, it is an aggregation of three sets of 4-port pilots. One kind of 12-port pilot pattern may be obtained through aggregation of three sets of 4-port pilots indicated by A\B\C in FIG. 2A. At this point, pilot of an antenna port A and pilot of an antenna port B are mapped to the same OFDM symbol (OFDM symbols 5 and 6 in time slot 0).

When the antenna port A transmits a pilot signal and an RE position mapped by the pilot of the antenna port B does not transmit a signal, the power of these REs may be added to the pilot signal of the antenna port A so as to improve a pilot signal power of the antenna port A. Similarly, when the antenna port B transmits a pilot signal and an RE position mapped by the pilot of the antenna port A does not transmit a signal, and the power of these REs can be added to the pilot signal of the antenna port B so as to improve a pilot signal power of the port B. While for a pilot signal of an antenna port C, since no pilot of other antenna ports is mapped on an OFDM symbol on which the pilot signal of the antenna port C is located, power of other REs cannot be borrowed. In this way, after power borrowing, the power of the antenna port A/B is twice the power of the antenna port C, and this results in inconsistency in powers of pilot signals sent from different antenna ports and then affects channel estimation quality of a reception end.

If the pilot signal of the antenna port A does not borrow the power of the RE position mapped by the pilot of the antenna port B, meanwhile the antenna port B does not perform power borrowing, and at the moment, although the pilot powers of the antenna port A/B/C may be substantially equal to each other, powers of the RE positions where no signals are transmitted in the antenna ports A and B are not utilized, and this leads to loss of transmission power of a base station end and then affects coverage of the pilot.

Figure 3:
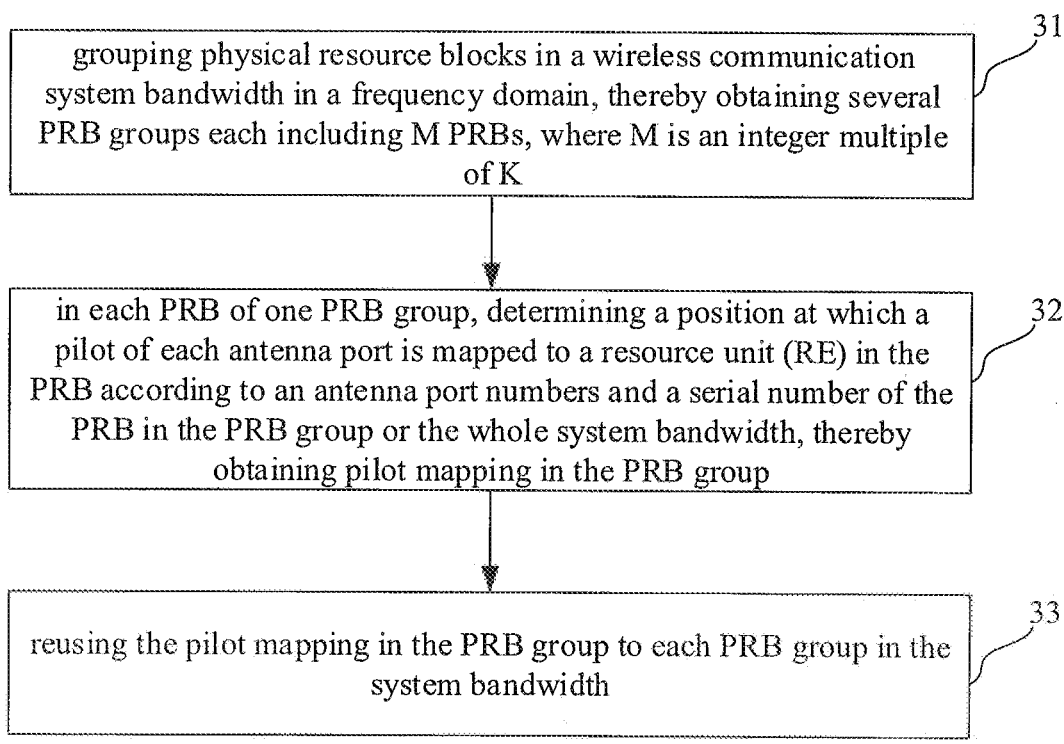
FIG. 3 is schematic flow chart of a pilot mapping method for antenna ports according to an embodiment of the present disclosure.

In order to realize mapping function for complex pilot antenna ports, one embodiment of the present disclosure provides a pilot mapping method for antenna ports of a wireless communication system. The antenna ports are divided into K antenna port groups, and each antenna port group includes no more than N antenna ports, where N and K are positive integers which are greater than or equal to 2. The pilot is preferentially CSI-RS. Referring to FIG. 3, the pilot mapping method includes:

Step 31 of grouping physical resource blocks (PRBs) in a wireless communication system bandwidth in a frequency domain, thereby obtaining several PRB groups each including M PRBs, where M is an integer multiple of K.

Here, the PRBs in the system bandwidth are grouped in the frequency domain in a manner that each group includes M PRBs. For example, every M PRBs that are continuous in the frequency domain in the system bandwidth may be grouped into one group. Of course, other grouping manners may also be adopted. For example, discrete and discontinuous PRBs may be grouped into the same group. In addition, since a total number of the PRBs in the system bandwidth may be an integer multiple of M, some PRBs may be not grouped into a certain group, and become remaining PRBs. The embodiments of the present disclosure will subsequently describe how to perform pilot mapping on these remaining PRBs.

Step 32 of, in each PRB of one PRB group, determining positions at which a pilot of each antenna port is mapped to resource elements (RE) in the PRB according to an antenna port index and an index of the PRB in the PRB group or the whole system bandwidth, thereby obtaining pilot mapping in the PRB group.

Here, the antenna ports of the wireless communication system are divided into K antenna port groups, and each antenna port group includes no more than N antenna ports. Each antenna port of the antenna port group is mapped to all REs mapped to an N-port pilot pattern.

The N-port pilot pattern may be various port pilot patterns in the related art, such as 2-port pilot pattern, 4-port pilot pattern and 8-port pilot pattern. Accordingly, the value of N may be 2, 4 or 8. K groups of pilot patterns may be selected from the N-port pilot patterns, thereby obtaining K groups of N-port pilot patterns. For example, there are totally 10 groups of pilot patterns in the 4-port pilot pattern shown in FIG. 1*b*, and *k* groups of 4-port pilot patterns may be selected from the 10 groups of pilot patterns.

Step 33 of reusing the pilot mapping in the PRB group to each PRB group in the system bandwidth.

In the above steps, one embodiment of the present disclosure first determines a pilot mapping mode in one PRB group, and then applies the pilot mapping mode to each PRB group in the subsequent step 33. It can be seen that in the above step 32, the position at which the pilot of each antenna port is mapped to the resource elements (RE) in the PRB is determined according to RE positions where the K groups of N-port pilot patterns in the N-port pilot patterns are mapped to as well as the index of the PRB in the PRB group, therefore, the variety of antenna ports are not always mapped to the same RE positions of different PRBs, thereby providing support for adjusting powers of the antenna ports.

In order to enable the powers of different antenna ports to be substantially equal to each other when power borrowing is performed, in the above step 32 of one embodiment of the present disclosure, when determining a position at which a pilot of each antenna port is mapped to resource elements (RE) in the PRB according to an antenna port index and an index of the PRB in the PRB group or the whole system bandwidth, each antenna port of the same antenna port group may be mapped to more than two groups of N-port pilot patterns in the PRB group; and for each antenna port group, in each PRB of the PRB group, a sum of the quantity of the N-port pilot patterns contained in the OFDM symbols where each antenna port group is located is the same.

Through the above mapping mode, one antenna port is mapped to more than two N-port pilot patterns, and the one antenna port is not always mapped to the same N-port pilot pattern as in the related art. In addition, the value of the sum of the above quantity for each antenna port group is the same, thereby ensuring that each antenna port group can realize the same power borrowing in one PRB group, and then ensuring consistency of the powers of the variety of antenna ports in the PRB group. Thus, the powers of the antenna ports of all the PRB groups in the system bandwidth are substantially equal to each other, thereby providing support for subsequent power borrowing and then making full use of the transmission power at the base station end, improving a coverage range of the pilot signal and the channel estimation quality of the reception end.

The above step 32 is further described hereinafter with following two more specific examples.

Example 1

In this example, each PRB uses the same K groups of N-port pilot patterns, that is, the K groups of N-port pilot patterns are fixed in the whole system bandwidth, and the same K groups of N-port pilot patterns are mapped in each PRB of the PRB group. In each PRB, the antenna port groups and the N-port pilot patterns are mapped in a one-to-one manner.

At this point, in each PRB of one PRB group, RE positions where pilots of all antenna ports are mapped to, are determined by RE positions where the same K groups of N-port pilot patterns are mapped to. Specifically, each antenna port group is mapped to an RE position where different N-port pilot patterns are mapped to. Each antenna port of the antenna port group is multiplexed on all RE positions where the N-port pilot pattern is mapped to.

In order to support for realizing consistency of powers of antenna ports, in this example, one antenna port group to which each antenna port belongs may be determined according to the antenna port index; then, determining N-port pilot patterns that are mapped by each antenna port of each antenna port group sequentially in each PRB of the PRB group according to the index of the PRB in the PRB group, each antenna port group is enabled to traverse integer times for the K groups of N-port pilot patterns in the PRB group, and the quantity of times of traversing of each antenna port group is the same, thereby obtaining a pilot pattern for the PRB group.

More detailed steps for determining mapping mode of antenna ports in one PRB group are provided hereinafter.

1) A pilot pattern in a first PRB of a PRB group is configured. The pilot pattern is obtained by aggregating K groups of N-port pilot patterns. The first antenna port group (antenna ports 0 to N−1) is mapped to a RE position of the first group of N-port pilot patterns; and the second antenna port group (antenna ports N to 2N−1) is mapped to a RE position of the second group of N-port pilot patterns, and so on; the K-th antenna port group (antenna ports (K−1)N to KN−1) is mapped to a RE position of the K-th group of N-port pilot pattern.

2) Pilot patterns in a second to K-th PRBs of the PRB group are configured. The pilot patterns in the second to the K-th PRBs are obtained by changing mapping relation between the antenna port group and the K group of N-port pilot patterns one the basis of the pilot pattern in the first PRB. RE positions of the K groups of N-port pilot patterns are traversed by each antenna port in the PRB group, for example, traversing for the integer time.

One possible implementation mode can adopt a grouping circulation shifting mode.

For the second PRB in the PRB group, the first antenna port group (antenna ports 0 to N−1) is mapped to the RE position of the second group of N-port pilot patterns, and the second antenna port group (antenna ports N to 2N−1) is mapped to the RE position of the third group of N-port pilot patterns, and so on; the K−1 antenna port groups (antenna ports (K−2)N to (K−1)N−1) is mapped to the RE position of the K-th group of N-port pilot patterns, and the K-th antenna port group (antenna ports (K−1)N to KN−1) is mapped to the RE position of the first group of N-port pilot patterns.

For the third PRB in the PRB group, the first antenna port group (antenna ports 0 to N−1) is mapped to the RE position of the third group of N-port pilot patterns, and the second antenna port group (antenna ports N to 2N−1) is mapped to the RE position of the fourth group of N-port pilot patterns, and son on; the K−1 antenna port groups (antenna ports (K−2)N to (K−1)N−1) is mapped to the RE position of the first group of N-port pilot patterns, and the K-th antenna port group (antenna ports (K−1)N to KN−1) is mapped to the RE position of the second group of N-port pilot patterns.

Sequentially and so on to the K-th PRB: the first antenna port group (antenna ports 0 to N−1) is mapped to the RE position of the K-th group of N-port pilot patterns, and the second antenna port group (antenna ports N to 2N−1) is mapped to the RE position of the first group of N-port pilot patterns, and so on; the (K−1)-th antenna port group (antenna ports (K−2)N to (K−1)N−1) is mapped to the RE positions of the (K−2)-th group of N-port pilot patterns, and the K-th antenna port group (antenna ports (K−1)N to KN−1) is mapped to the RE positions of the (K−1)-th group of N-port pilot patterns.

Figure 4:
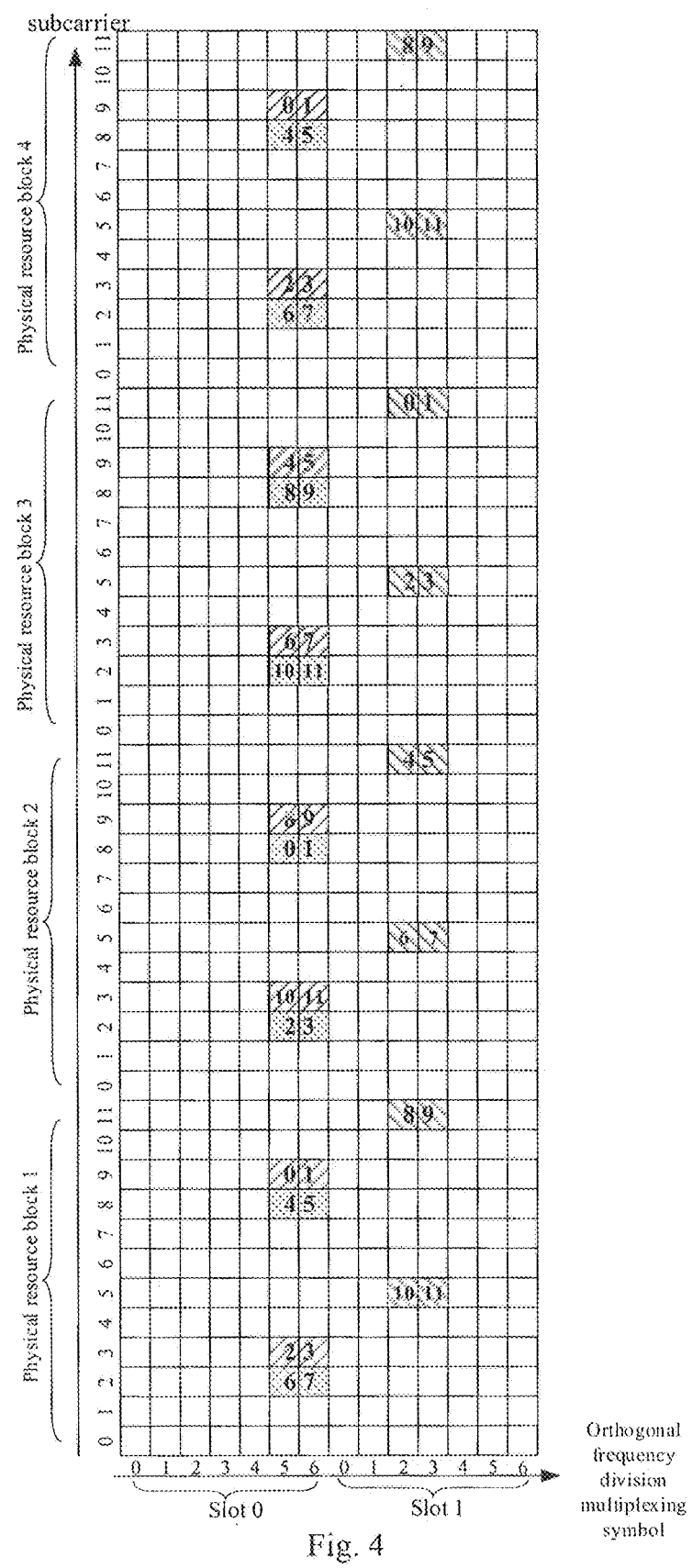
FIG. 4 is schematic diagram of a pilot mapping pattern according to an embodiment of the present disclosure.

According to the above description, FIG. 4 shows an embodiment of a 12-port pilot pattern. The smallest block in FIG. 4 represents an RE, and the numbers 0-11 in the blocks represent port numbers of antenna ports. Each antenna port group includes four antenna ports. Pilot signals of each antenna port occupy 4 RE positions with the same filling pattern as the RE at which the port number is located. The pilot signals of the four antenna ports at the REs with the same filling pattern are multiplexed with OCC=4. Aggregation of three groups of 4-port pilot pattern is used as shown in FIG. 3. Each PRB group includes 3 PRBs. REs of the antenna port index 0-3 on the PRB1 represent a first group of 4-port pilot patterns. REs of the antenna port index 4-7 on the PRB1 represent a second group of 4-port pilot patterns. REs of the antenna port index 8-11 on the PRB1 represent a third group of 4-port pilot frequency patterns. In FIG. 4, there are many un-used 4-port RE positions. As can be seen from FIG. 4, each OFDM symbol includes a 12-port CSI-RS pilot from an angle of the whole system bandwidth. In one PRB, when a pilot signal of one antenna port is mapped to OFDM symbols 5 and 6 of a time slot 0, and the power of the RE positions mapped by pilot of another group of antenna ports on the OFDM symbols 5, 6 can be borrowed. When the pilot signal of one antenna port is mapped to the OFDM symbols 2 and 3 of the time slot 1, power borrowing is not carried out. In this way, the pilot signals of all antenna ports can be ensured to have the same power in each PRB group, so that the transmitting power on the base station end can be fully utilized.

Example 2

In this example, different K groups of N-port pilot patterns are mapped in different PRBs of the PRB group. In each PRB, the antenna port groups and the N-port pilot patterns are mapped according to a in a one-to-one manner. In different PRBs of one PRB group, RE positions where pilots of all antenna ports are mapped to are determined by RE positions where the different K groups of N-port pilot patterns are mapped to. Specifically, each antenna port group is mapped to an RE position where different N-port pilot patterns are mapped to. Each antenna port of the antenna port group is multiplexed on all RE positions where the N-port pilot pattern is mapped to.

In order to support for realizing consistency of powers of antenna ports, in this example, one antenna port group to which each antenna port belongs may be determined according to the antenna port index.

Then, an aggregated pilot pattern group for the first PRB of the PRB group is configured. The pilot pattern group includes K groups of N-port pilot patterns. An N-port pilot pattern mapped by each antenna port group in the first PRB is determined; and a first sequence defined by the quantity of the N-port pilot patterns contained in the OFDM symbols where each antenna port group is located in the first PRB is determined.

According to the index of the PRB in the PRB group, pilot pattern groups for remaining PRBs in the PRB group are sequentially determined. Each antenna port group is enabled to traverse all values in the first sequence for integer times according to the quantity of N-port pilot patterns contained in the OFDM symbols where each antenna port group is located in each PRB of the PRB group. Further, the quantity of times of traversing performed by each antenna port group is the same. In this way, the pilot pattern for the PRB group is obtained.

In this example, each PRB may use different K groups of N-port pilot patterns for aggregation. In each PRB, the first antenna port group (antenna ports 0 to N−1) is mapped to the RE position of the first group of N-port pilot patterns; the second antenna port group (antenna ports N to 2N−1) is mapped to the RE position of the second group of N-port pilot patterns, and so on; and the K-th antenna port group (antenna ports (K−1)N to KN−1−1) is mapped to the RE position of the K-th group of N-port pilot patterns.

More detailed steps for determining mapping mode of antenna ports in one PRB group are provided hereinafter.

1) A pilot pattern in the first PRB of one PRB group is configured. It is assumed that after borrowing power, a pilot power for the RE position of the first to K1-th group of N-port pilot patterns is P1, and a pilot power for the RE position of the (K1+1)-th to the K-th group of N-port pilot patterns is P2.

2) A pilot pattern in the second PRB to K-th PRB of the PRB group is configured. After K PRBs in the PRB group are configured, it is required that a sum of pilot powers for all RE positions mapped by each antenna port in the K PRBs is the same.

One possible implementation mode can adopt a grouping circulation shifting mode.

In the pilot pattern of the second PRB, after borrowing power, a pilot power for the RE position of the second to (K1+1)-th group of N-port pilot patterns is P1, and a pilot power for the RE position of the (K1+2)-th to the K-th group of N-port pilot patterns as well as the first group of N-port pilot patterns is P2.

In the pilot pattern of the third PRB, after borrowing power, a pilot power for the RE position of the third to (K1+2)-th group of N-port pilot patterns is P1, and a pilot power for the RE position of the (K1+3)-th to the K-th group of N-port pilot patterns as well as the first and second groups of N-port pilot patterns is P2.

Sequentially and so on to the K-th PRB, a pilot power for the RE position of the K-th group of N-port pilot patterns as well as the first to (K1−1)-th group of N-port pilot patterns is P1, and a pilot power for the RE position of the (K1)-th to the (K−1)-th group of N-port pilot patterns is P2.

Figure 5:
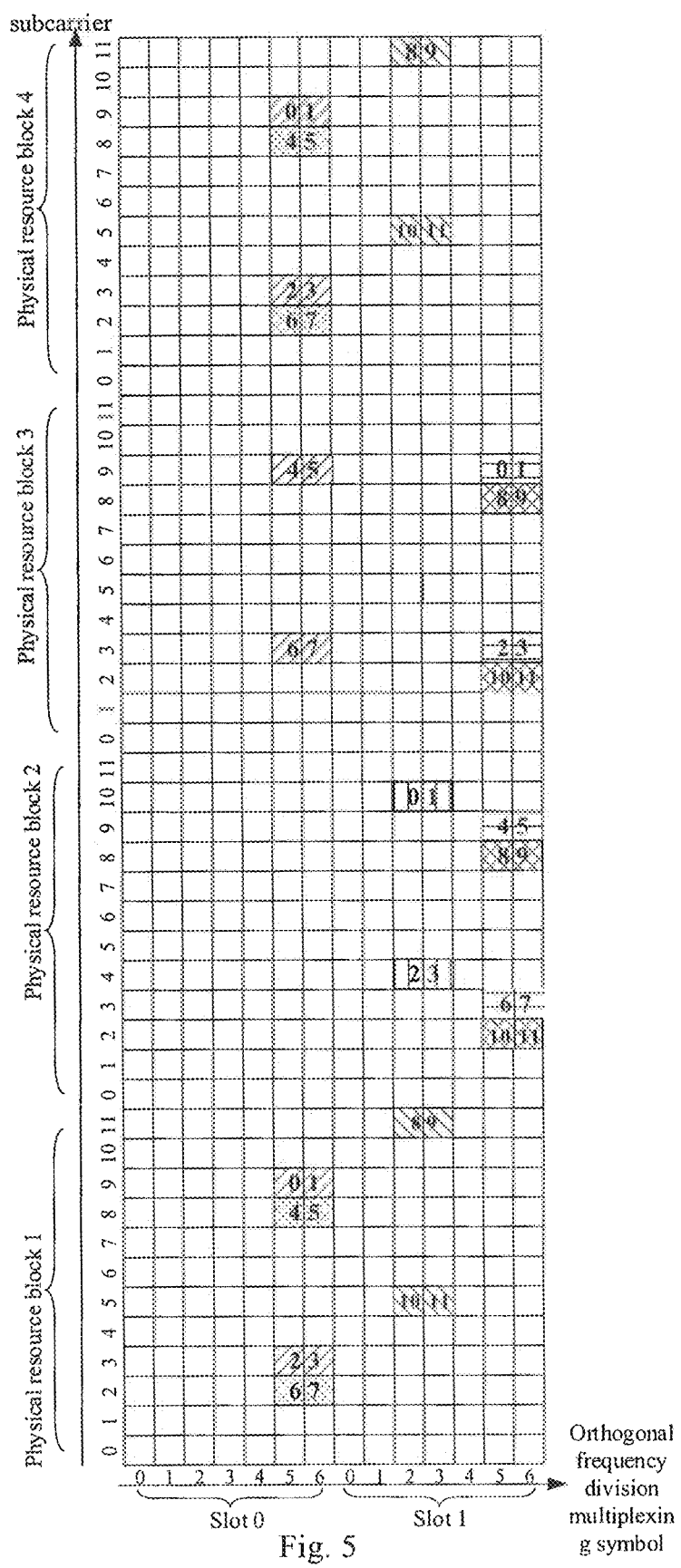
FIG. 5 is schematic diagram of another pilot mapping pattern according to an embodiment of the present disclosure.

According to the above description, FIG. 5 shows an embodiment of a 12-port pilot pattern. The smallest block in FIG. 4 represents an RE, and the numbers 0-11 in the blocks represent port numbers of antenna ports. Each antenna port group includes four antenna ports. Aggregation of three groups of 4-port pilot patterns is used in each PRB in the diagram. For the first PRB, the pilot power of the RE position mapped by the antenna ports 0-3 and the antenna ports 4-7 is p1, and the pilot power of the RE position mapped by the antenna ports 8-11 is ½*p1. For the second PRB, the pilot power of the RE position mapped by the antenna ports 4-7 and the antenna ports 8-11 is p1, and the pilot power of the RE position mapped by the antenna ports 0-3 is ½*p1. For the third PRB, the pilot power of the RE position mapped by the antenna ports 8-11 and the antenna ports 0-3 is P1, and the pilot power of the RE position mapped by the antenna ports 4-7 is ½*P1. Thus, when K=3 PRBs, the power of the pilot signals of each antenna port is the same, so that the transmitting power of the base station end is fully utilized.

Considering that the quantity of PRBs in the bandwidth of the wireless communication system may not be an integer multiple of M, after the PRBs are grouped, there may be ungrouped remaining PRBs. At this point, remaining PRBs may adopt pilot mapping of the variety of PRBs of the PRB group one by one. For example, according to the quantity of the remaining PRBs, the same quantity of PRBs are arbitrarily selected from the PRB group, and the pilot mapping of the same quantity of PRBs are used for the remaining PRBs.

Figure 6:
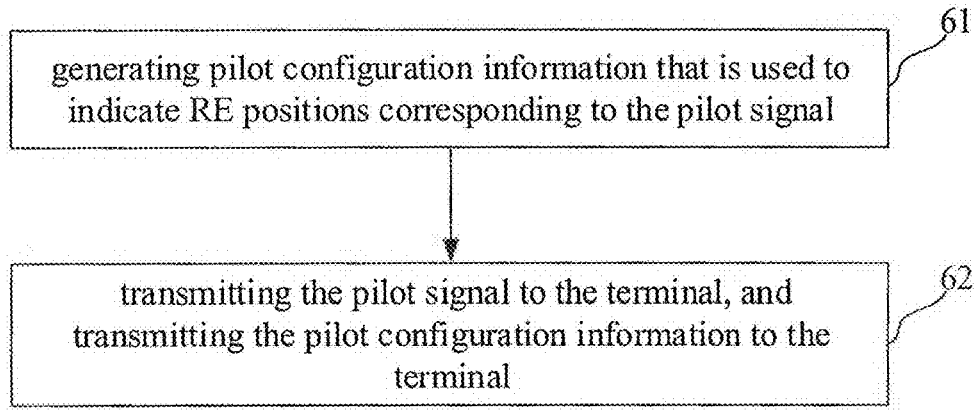
FIG. 6 is schematic flow chart of a pilot transmission method according to an embodiment of the present disclosure.
Figure 7:
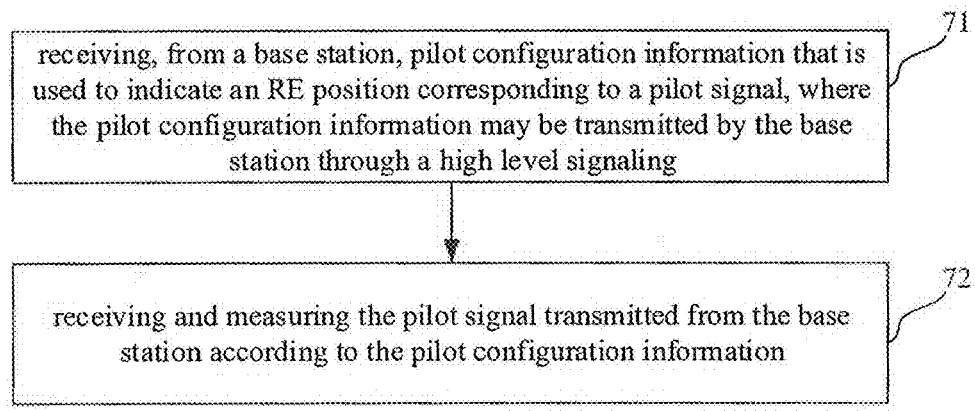
FIG. 7 is schematic flow chart of another pilot transmission method according to an embodiment of the present disclosure.

Based on the pilot signal obtained through the above pilot mapping method, one embodiment of the present disclosure further provides a pilot transmission method. Referring to FIG. 6, the pilot transmission method may be applied to a network side, for example, a base station (eNB), and specifically includes:

step 61 of generating pilot configuration information that is used to indicate RE positions corresponding to the pilot signal;

step 62 of transmitting the pilot signal to the terminal, and transmitting the pilot configuration information to the terminal, thereby enabling the terminal to receive the pilot signal according to the pilot configuration information.

Here, the pilot configuration information may include an index of each PRB of the PRB group and a pilot configuration pattern for each PRB. The above pilot configuration information may also include an index of each PRB in the system bandwidth and a pilot configuration pattern for each PRB. The base station may transmit the pilot configuration information to the terminal through a high level signaling.

One embodiment of the present disclosure further provides another pilot signal transmission method, which may be applied to the terminal side and specifically includes:

step 71 of receiving, from a base station, pilot configuration information that is used to indicate an RE position corresponding to a pilot signal, where the pilot configuration information may be transmitted by the base station through a high level signaling; and step 72 of receiving and measuring the pilot signal transmitted from the base station according to the pilot configuration information.

Figure 8:
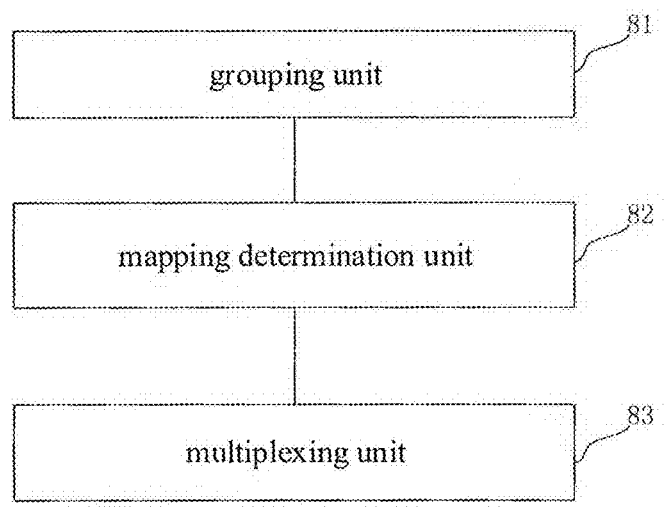
FIG. 8 is schematic diagram of a pilot mapping apparatus for antenna ports according to an embodiment of the present disclosure.

One embodiment of the present disclosure further provides a pilot mapping apparatus for antenna ports. The antenna ports are divided into K antenna port groups, and each antenna port group includes no more than N antenna ports. The pilot mapping apparatus may be disposed at the network side, for example, the pilot mapping apparatus may be disposed in the base station as one part of the base station. The pilot mapping apparatus may also be a separate functional entity. As shown in FIG. 8, the pilot mapping apparatus includes:

a grouping unit 81 configured to group physical resource blocks (PRBs) in a wireless communication system bandwidth in a frequency domain, thereby obtaining several PRB groups each including M PRBs, where M is an integer multiple of K;

a mapping determination unit 82 configured to, in each PRB of one PRB group, determine positions at which a pilot of each antenna port is mapped to resource elements (RE) in the PRB according to an antenna port index and an index of the PRB in the PRB group or the whole system bandwidth, thereby obtaining pilot mapping in the PRB group; and a multiplexing unit 83 configured to reuse the pilot mapping in the PRB group to each PRB group in the system bandwidth.

The grouping unit 81 is specifically used to group every M PRBs that are continuous in the frequency domain in the system bandwidth into one group.

Each PRB is mapped to K groups of N-port pilot patterns in the N-port pilot patterns.

The multiplexing unit 82 is used to, when determining a position at which a pilot of each antenna port is mapped to resource elements (RE) in the PRB according to an antenna port index and an index of the PRB in the PRB group or the whole system bandwidth, enable each antenna port of the same antenna port group to be mapped to more than two groups of N-port pilot patterns in the PRB group, and enable a sum of the quantity of the N-port pilot patterns contained in the OFDM symbols which are in each PRB of the PRB group and in which each antenna port group is located to be the same.

As an optional embodiment, in each PRB of one PRB group, RE positions where pilots of all antenna ports are mapped to, are determined by RE positions where the same K groups of N-port pilot patterns are mapped to; each antenna port group is mapped to an RE position where different N-port pilot patterns are mapped to, and each antenna port of the antenna port group is multiplexed on all RE positions where the N-port pilot pattern is mapped to. At this point, the mapping determination unit includes:

a port group determining sub-unit used to determine one antenna port group to which each antenna port belongs according to the antenna port index; and a first traversing sub-unit used to determine N-port pilot patterns that are mapped by each antenna port of each antenna port group sequentially in each PRB of the PRB group according to the index of the PRB in the PRB group, to enable each antenna port group to traverse integer times for the K groups of N-port pilot patterns in the PRB group, with the quantity of times of traversing of each antenna port group being the same, thereby obtaining a pilot pattern for the PRB group.

As another optional embodiment, in different PRBs of one PRB group, RE positions where pilots of all antenna ports are mapped to are determined by RE positions where the different K groups of N-port pilot patterns are mapped to; each antenna port group is mapped to an RE position where different N-port pilot patterns are mapped to, and each antenna port of the antenna port group is multiplexed on all RE positions where the N-port pilot pattern is mapped to. At this point, the mapping determination unit includes:

a port group determining sub-unit used to determine one antenna port group to which each antenna port belongs according to the antenna port index;

a configuration sub-unit used to configure an aggregated pilot pattern group for the first PRB of the PRB group, where the pilot pattern group includes K groups of N-port pilot patterns; determine an N-port pilot pattern mapped by each antenna port group in the first PRB; and determine a first sequence defined by the quantity of the N-port pilot patterns contained in the OFDM symbols where each antenna port group is located in the first PRB;

a second traversing sub-unit used to, according to the index of the PRB in the PRB group, sequentially determine pilot pattern groups for remaining PRBs in the PRB group, and determine N-port pilot patterns that are mapped by each antenna port of each antenna port group; enable each antenna port group to traverse all values in the first sequence for integer times according to the quantity of N-port pilot patterns contained in the OFDM symbols where each antenna port group is located in each PRB of the PRB group, where the quantity of times of traversing performed by each antenna port group is the same. In this way, the pilot pattern for the PRB group is obtained.

In this embodiment, the above pilot mapping apparatus may further include: an additional mapping unit used to, when the quantity of PRBs in the bandwidth of the wireless communication system is not an integer multiple of M, determine remaining PRBs after the PRBs are grouped, and adopt pilot mapping of the variety of PRBs of the PRB group one by one for the remaining PRBs.

Figure 9:
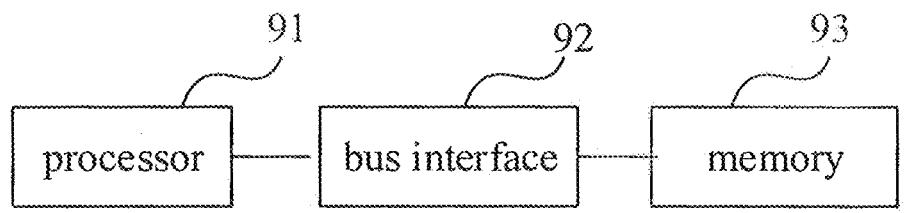
FIG. 9 is schematic diagram of another pilot mapping apparatus for antenna ports according to an embodiment of the present disclosure.

Referring to FIG. 9, another embodiment of the present disclosure further provides a pilot mapping apparatus includes: a processor 91, a memory 93 coupled to the processor 91 through a bus interface 92. The memory 91 is used to store programs and data used by the processor 91 when performing operations. When the processor 91 calls and executes the programs and data stored in the memory 93, functions of the following function modules:

a grouping unit configured to group physical resource blocks (PRBs) in a wireless communication system bandwidth in a frequency domain, thereby obtaining several PRB groups each including M PRBs, where M is an integer multiple of K;

a mapping determination unit configured to, in each PRB of one PRB group, determine positions at which a pilot of each antenna port is mapped to resource elements (RE) in the PRB according to an antenna port index and an index of the PRB in the PRB group or the whole system bandwidth, thereby obtaining pilot mapping in the PRB group; and a multiplexing unit configured to reuse the pilot mapping in the PRB group to each PRB group in the system bandwidth.

Figure 10:
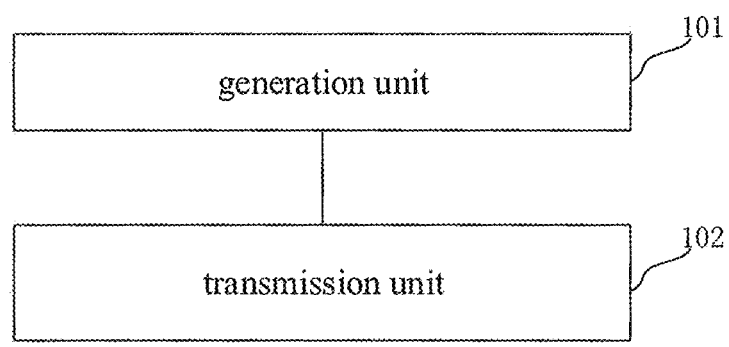
FIG. 10 is schematic diagram of a base station according to an embodiment of the present disclosure.

Referring to FIG. 10, one embodiment of the present disclosure further provides a base station which may be used to transmit a pilot signal obtained by the above pilot mapping method. As shown in FIG. 10, the base station includes:

a generation unit 101 used to generate pilot configuration information that is used to indicate RE positions corresponding to the pilot signal; and a transmission unit 102 used to transmit the pilot signal to the terminal, and transmit the pilot configuration information to the terminal, thereby enabling the terminal to receive the pilot signal according to the pilot configuration information.

Figure 11:
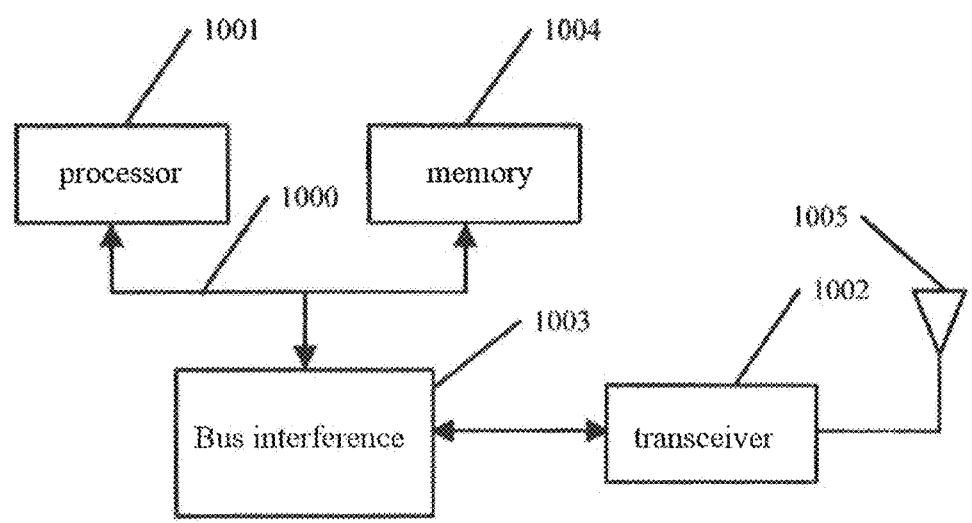
FIG. 11 is schematic diagram of another base station according to an embodiment of the present disclosure.

Referring to FIG. 11, one embodiment of the present disclosure provides another base station, which may be used to transmit a pilot signal obtained by the above pilot mapping method. As shown in FIG. 11, the base station includes:

a processor 1001 used to read programs in a memory 1004 and perform the following procedures: generating pilot configuration information that is used to indicate RE positions corresponding to the pilot signal; controlling a transceiver 1002 to transmit the pilot signal to the terminal, and transmitting the pilot configuration information to the terminal, thereby enabling the terminal to receive the pilot signal according to the pilot configuration information; and the transceiver 1002 used to receive and transmit data under control of the processor 1001.

In FIG. 10, the bus architecture (represented by the bus 1000) may include any number of interconnected buses and bridges, which may specifically be linked by various circuits of one or more processors represented by the processor 1001 and a storage represented by the memory 1004. The bus 1000 also links various other circuits such as peripherals, voltage regulators, and power management circuits. A bus interface 1003 provides an interface between the bus 1000 and the transceiver 1002. The transceiver 1002 may be one or more components, such as multiple receivers and transmitters, providing means for communicating with various other devices on a transmission medium. The data processed by the processor 1001 is transmitted over the wireless medium via the antenna 1005. Further, the antenna 1005 also receives the data and transmits the data to the processor 1001.

The processor 1001 is responsible for managing the bus 1000 and normal processing, as well as providing various functions including timing, peripheral interfaces, voltage regulation, power management and other control functions. The memory 1004 may be used to store data used by the processor 1001 in performing operations.

Optionally, the processor 1001 may be a central processing unit (CPU), an application specific integrated Circuit (ASIC), a field programmable gate array (FPGA), or a complex programmable logic device (CPLD).

Figure 12:
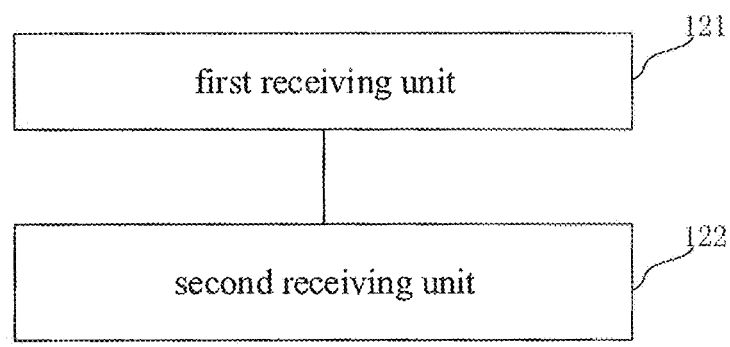
FIG. 12 is schematic diagram of a terminal according to an embodiment of the present disclosure.

Referring to FIG. 12, one embodiment of the present disclosure provides a terminal which may be used to transmit a pilot signal obtained by the above pilot mapping method. As shown in FIG. 12, the terminal includes:

a first receiving unit 121 used to receive, from a base station, pilot configuration information that is used to indicate an RE position corresponding to a pilot signal; and a second receiving unit 122 used to receive and measure the pilot signal transmitted from the base station according to the pilot configuration information.

Figure 13:
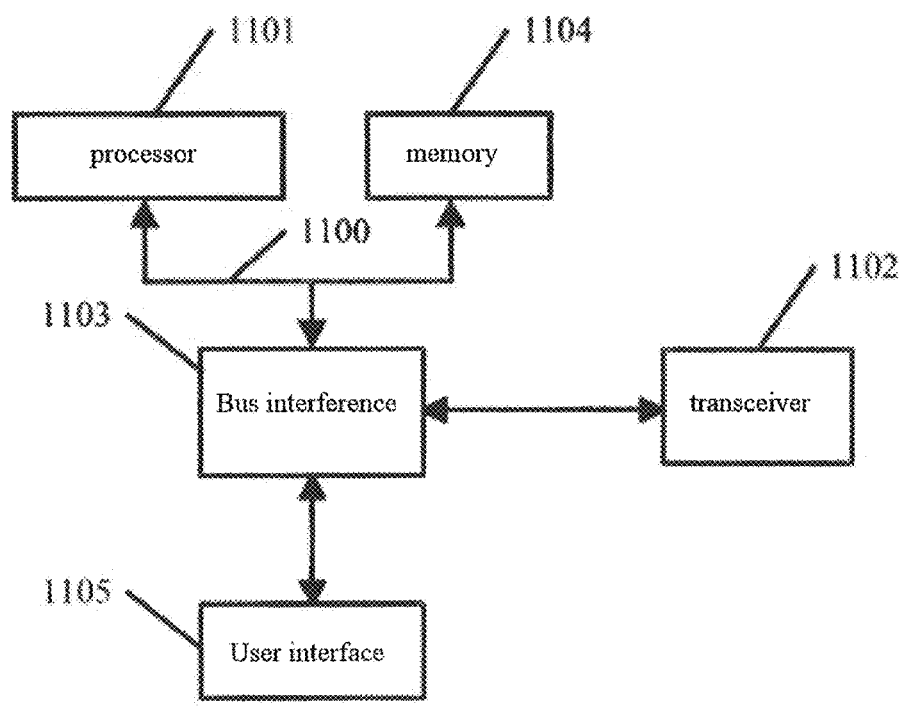
FIG. 13 is schematic diagram of another terminal according to an embodiment of the present disclosure.

Referring to FIG. 13, one embodiment of the present disclosure provides another terminal which may be used to transmit a pilot signal obtained by the above pilot mapping method. As shown in FIG. 13, the terminal includes:

a processor 1101 used to read programs in a memory 1104 and perform the following procedures: receiving, from a base station through a transceiver 1102, pilot configuration information that is used to indicate an RE position corresponding to a pilot signal, receiving and measuring the pilot signal transmitted from the base station according to the pilot configuration information; and the transceiver 1102 used to receive and transmit data under control of the processor 1101.

In FIG. 11, the bus architecture (represented by the bus 1100) may include any number of interconnected buses and bridges, which may specifically be linked by various circuits of one or more processors represented by the processor 1101 and a storage represented by the memory 1104. The bus 1100 also links various other circuits such as peripherals, voltage regulators, and power management circuits. A bus interface 1103 provides an interface between the bus 1100 and the transceiver 1102. The transceiver 1102 may be one or more components, such as multiple receivers and transmitters, providing means for communicating with various other devices on a transmission medium. For example, the transceiver 1102 may receive external data from other devices. The transceiver 1102 is used to send the data processed by the processor 1101 to other devices. Depending on the nature of the computing system, a user interface 1105 may also be provided, such as a keypad, display, speaker, microphone, joystick.

The processor 1101 is responsible for managing the bus 1100 and the normal processing, running a general purpose operating system as described above. The memory 1104 may be used to store data used by the processor 1101 when performing operations.

Optionally, the processor 1101 may be CPU, ASIC, FPGA or CPLD.

Those skilled in the art will understand that embodiments of the present disclosure may be provided as a method, system, or computer program product. Accordingly, the present disclosure may take the form of an entirely hardware embodiment, an entirely software embodiment, or a combination of software and hardware aspects. Moreover, the present disclosure may take the form of a computer program product embodied on one or more computer-usable storage media (including but not limited to disk storage, CD-ROM, optical storage, etc.) including computer usable program code.

The present disclosure has been described with reference to the flow charts and/or block diagrams of the method, device (system) and computer program product according to the embodiments of the present disclosure. It should be understood that computer program instructions may be used to implement each of the work flows and/or blocks in the flow charts and/or the block diagrams, and the combination of the work flows and/or blocks in the flow charts and/or the block diagrams. These computer program instructions may be provided to a processor of a common computer, a dedicate computer, an embedded processor or any other programmable data processing devices to create a machine, so that instructions executable by the processor of the computer or the other programmable data processing devices may create a device to achieve the functions assigned in one or more work flows in the flow chart and/or one or more blocks in the block diagram.

These computer program instructions may also be stored in a computer readable storage that may guide the computer or the other programmable data process devices to function in a certain way, so that the instructions stored in the computer readable storage may create a product including an instruction unit which achieves the functions assigned in one or more flows in the flow chart and/or one or more blocks in the block diagram.

These computer program instructions may also be loaded in the computer or the other programmable data process devices, so that a series of operation steps are executed on the computer or the other programmable devices to create processes achieved by the computer. Therefore, the instructions executed in the computer or the other programmable devices provide the steps for achieving the function assigned in one or more flows in the flow chart and/or one or more blocks in the block diagram.

The above are merely the preferred embodiments of the present disclosure and shall not be used to limit the scope of the present disclosure. It should be noted that, a person skilled in the art may make improvements and modifications without departing from the principle of the present disclosure, and these improvements and modifications shall also fall within the scope of the present disclosure.

What is claimed is:

1. A pilot signal mapping method for antenna ports that include K antenna port groups each including no more than N antenna ports, the pilot signal mapping method comprising:

grouping physical resource blocks (PRBs) in a wireless communication system bandwidth in the frequency domain, thereby obtaining a plurality of PRB groups each including M PRBs, where M is an integer multiple of K;

in each PRB of one of the PRB groups, determining positions at which a pilot of each antenna port is mapped to resource elements (RE) in the each PRB according to an antenna port index and an index of the each PRB in the one of the PRB groups or the whole system bandwidth, where each antenna port in each antenna port group is mapped to more than two N-port pilot patterns in the one of the PRB groups; and wherein in the one of the PRB groups, the sum across the PRBs of the one of the PRB groups of the quantity of the N-port pilot patterns contained in Orthogonal Frequency Division Multiplexing (OFDM) symbols where each antenna port group is located is the same across the antenna port groups, thereby obtaining pilot signal mapping in the one of the PRB groups; and reusing the pilot signal mapping in the one of the PRB groups to each PRB group in the system bandwidth;

wherein in each PRB, there are OFDM symbols mapped with different N-port pilot patterns, and such OFDM symbols mapped with different N-port pilot patterns include different numbers of N-port pilot patterns.

2. The pilot signal mapping method of claim 1, wherein the grouping physical resource blocks in the wireless communication system bandwidth in the frequency domain includes:

grouping every M PRBs that are continuous in the frequency domain in the system bandwidth into one group.

3. The pilot signal mapping method of claim 1, wherein each PRB of the one of the PRB groups is mapped with K groups of N-port pilot patterns; the K antenna port groups correspond to the K groups of N-port pilot patterns in a one-to-one manner, and each antenna port group is mapped to RE positions where a corresponding N-port pilot pattern is mapped to; all RE positions where the corresponding N-port pilot pattern is mapped to, are multiplexed by each antenna port of each antenna port group;

wherein the determining the positions at which the pilot of each antenna port is mapped to the resource elements in the each PRB includes:

determining one antenna port group to which each antenna port belongs, according to the antenna port index; and according to the index of the each PRB in the one of the PRB groups, in each PRB of the one of the PRB groups, sequentially determining the N-port pilot patterns that are mapped with each antenna port of each antenna port group, for each antenna port group, traversing the K groups of N-port pilot patterns for integer times in the one of the PRB groups with the quantity of times of traversing performed for each antenna port group being the same, thereby obtaining a pilot pattern for the one of the PRB groups.

4. The pilot signal mapping method of claim 1, wherein different PRBs of the one of the PRB groups are mapped with different K groups of N-port pilot patterns; the K antenna port groups correspond to the K groups of N-port pilot patterns in a one-to-one manner, and each antenna port group is mapped to RE positions where the corresponding N-port pilot pattern is mapped to; all RE positions where the a corresponding N-port pilot pattern is mapped to, are multiplexed by each antenna port of each antenna port group;

wherein the determining the positions at which the pilot of each antenna port is mapped to the resource elements in the each PRB according to an antenna port index and an index of the each PRB in the one of the PRB groups or the whole system bandwidth includes:

determining one antenna port group to which each antenna port belongs, according to the antenna port index;

configuring an aggregated pilot pattern group for a first PRB of the one of the PRB groups, wherein the aggregated pilot pattern group includes K groups of N-port pilot patterns; determining an N-port pilot pattern mapped with each antenna port group in the first PRB; and determining a first sequence defined by the quantity of the N-port pilot patterns contained in the OFDM symbols where each antenna port group is located in the first PRB; and according to the index of the each PRB in the one of the PRB groups, sequentially determining pilot pattern groups for remaining PRBs in the one of the PRB groups, and determining N-port pilot patterns that are mapped with each antenna port of each antenna port group; for each antenna port group, traversing all values in the first sequence for integer times according to the quantity of N-port pilot patterns contained in the OFDM symbols where each antenna port group is located in each PRB of the one of the PRB groups, with the quantity of times of traversals performed for each antenna port group being the same, thereby obtaining the pilot pattern for the one of the PRB groups.

5. The pilot signal mapping method of claim 1, wherein when the quantity of PRBs in the bandwidth of the wireless communication system is not an integer multiple of M, the method further includes:

determining any remaining PRBs from the plurality of PRBs after the PRBs are grouped, and according to the quantity of the remaining PRBs, selecting the same quantity of PRBs from the one of the PRB groups, and adopting the pilot signal mapping of the same quantity of PRBs for the remaining PRBs.

6. A pilot signal transmission method for transmitting a pilot signal obtained through the pilot signal mapping method of claim 1, the pilot signal transmission method comprising:

generating pilot configuration information that indicates RE positions corresponding to the pilot signal; and transmitting the pilot signal to a terminal, and transmitting the pilot configuration information to the terminal, thereby enabling the terminal to receive the pilot signal according to the pilot configuration information.

7. A pilot signal transmission method for transmitting a pilot signal obtained through the pilot signal mapping method of claim 1, the pilot signal transmission method comprising:

receiving, from a base station, pilot configuration information that indicates an RE position corresponding to a pilot signal; and receiving and measuring the pilot signal transmitted from the base station according to the pilot configuration information.

8. A pilot signal mapping apparatus for antenna ports that include K antenna port groups each including no more than N antenna ports, the pilot signal mapping apparatus comprising:

a grouping unit configured to group physical resource blocks (PRBs) in a wireless communication system bandwidth in the frequency domain, thereby obtaining a plurality of PRB groups each including M PRBs, where M is an integer multiple of K;

a mapping determination unit configured to, in each PRB of one of the PRB groups, determine positions at which a pilot of each antenna port is mapped to resource elements (RE) in the each PRB according to an antenna port index and an index of the each PRB in the one of the PRB groups or the whole system bandwidth, where each antenna port in each antenna port group is mapped to more than two N-port pilot patterns in the one of the PRB groups; and wherein in the one of the PRB groups, the sum across the PRBs of the one of the PRB groups of the quantity of the N-port pilot patterns contained in the Orthogonal Frequency Division Multiplexing (OFDM) symbols where each antenna port group is located is the same across the antenna port groups, thereby obtaining pilot signal mapping in the one of the PRB groups; and a multiplexing unit configured to reuse the pilot signal mapping in the one of the PRB groups to each PRB group in the system bandwidth;

wherein in each PRB, there are OFDM symbols mapped with different N-port pilot patterns, and such OFDM symbols mapped with different N-port pilot patterns include different numbers of N-port pilot patterns.

9. The pilot signal mapping apparatus of claim 8, wherein the grouping unit is specifically configured to group every M PRBs that are continuous in the frequency domain in the system bandwidth into one group.

10. The pilot signal mapping apparatus of claim 8, wherein each PRB of the one of the PRB groups is mapped with K groups of N-port pilot patterns; the K antenna port groups correspond to the K groups of N-port pilot patterns in a one-to-one manner, and each antenna port group is mapped to RE positions where the a corresponding N-port pilot pattern is mapped to; all RE positions where the corresponding N-port pilot pattern is mapped to, are multiplexed by each antenna port of each antenna port group; the mapping determination unit includes:

a port group determining sub-unit configured to determine one antenna port group to which each antenna port belongs, according to the antenna port index; and a first traversing sub-unit configured to determine the N-port pilot patterns that are mapped with each antenna port of each antenna port group sequentially in each PRB of the one of the PRB groups according to the index of the each PRB in the one of the PRB groups; for each antenna port group, traverse the K groups of N-port pilot patterns for integer times in the one of the PRB groups with the quantity of times of traversing performed for each antenna port group being the same, thereby obtaining the pilot pattern for the one of the PRB groups.

11. The pilot signal mapping apparatus of claim 8, wherein different PRBs of the one of the PRB groups are mapped with different K groups of N-port pilot patterns; the K antenna port groups correspond to the K groups of N-port pilot patterns in a one-to-one manner, and each antenna port group is mapped to RE positions where a corresponding N-port pilot pattern is mapped to; all RE positions where the corresponding N-port pilot pattern is s mapped to, are multiplexed by each antenna port of each antenna port group; the mapping determination unit includes:

a port group determining sub-unit configured to determine one antenna port group to which each antenna port belongs, according to the antenna port index;

a configuration sub-unit configured to, configure an aggregated pilot pattern group for a first PRB of the one of the PRB groups, wherein the aggregated pilot pattern group includes K groups of N-port pilot patterns; determine an N-port pilot pattern mapped with each antenna port group in the first PRB; and determine a first sequence defined by the quantity of the N-port pilot patterns contained in the OFDM symbols where each antenna port group is located in the first PRB; and a second traversing sub-unit configured to, according to the index of the each PRB in the one of the PRB groups, sequentially determine pilot pattern groups for remaining PRBs in the one of the PRB groups, and determine N-port pilot patterns that are mapped with each antenna port of each antenna port group; for each antenna port group, traverse all values in the first sequence for integer times according to the quantity of N-port pilot patterns contained in the OFDM symbols where each antenna port group is located in each PRB of the one of the PRB groups, with the quantity of times of traversing performed for each antenna port group being the same, thereby obtaining the pilot pattern for the one of the PRB groups.

12. The pilot signal mapping apparatus of claim 8, further comprising:

an additional mapping determination unit configured to, when the quantity of PRBs in the bandwidth of the wireless communication system is not an integer multiple of M, determine any remaining PRBs from the plurality of PRBs after the PRBs are grouped; according to the quantity of the remaining PRBs, select the same quantity of PRBs from the one of the PRB groups, and adopt the pilot signal mapping of the same quantity of PRBs for the remaining PRBs.

13. A base station for transmitting a pilot signal obtained through the pilot signal mapping method of claim 1, the base station comprising:
a generation unit configured to generate pilot configuration information that indicates RE positions corresponding to the pilot signal; and
a transmission unit configured to transmit the pilot signal to a terminal, and transmit the pilot configuration information to the terminal, thereby enabling the terminal to receive the pilot signal according to the pilot configuration information.

14. A terminal for transmitting a pilot signal obtained through the pilot signal mapping method of claim 1, the terminal comprising:
a first receiving unit configured to receive, from a base station, pilot configuration information that indicates an RE position corresponding to a pilot signal; and
a second receiving unit configured to receive and measure the pilot signal transmitted from the base station according to the pilot configuration information.

15. A pilot signal mapping apparatus for antenna ports that include K antenna port groups each including no more than N antenna ports, the pilot signal mapping apparatus comprising: a processor and a memory coupled to the processor through a bus interface;
wherein the memory is configured to store programs and data used by the processor when performing operations;
when the processor calls and executes the programs and data stored in the memory, the processor is configured to,
group physical resource blocks (PRBs) in a wireless communication system bandwidth in the frequency domain, thereby obtaining a plurality of PRB groups each including M PRBs, where M is an integer multiple of K;
in each PRB of one of the PRB groups, determine positions at which a pilot of each antenna port is mapped to resource elements (RE) in the each PRB according to an antenna port index and an index of the each PRB in the one of the PRB groups or the whole system bandwidth, where each antenna port in each antenna port group is mapped to more than two N-port pilot patterns in the one of the PRB groups; and
wherein in the one of the PRB groups, the sum across the PRBs of the one of the PRB groups of the quantity of the N-port pilot patterns contained in Orthogonal Frequency Division Multiplexing (OFDM) symbols where each antenna port group is located is the same across the antenna port groups, thereby obtaining pilot signal mapping in the one of the PRB groups; and
reuse the pilot signal mapping in the one of the PRB groups to each PRB group in the system bandwidth;
wherein in each PRB, there are OFDM symbols mapped with different N-port pilot patterns, and such OFDM symbols mapped with different N-port pilot patterns include different numbers of N-port pilot patterns.

16. A base station for transmitting a pilot signal obtained through the pilot signal mapping method of claim 1, the base station comprising: a processor, a transceiver and a memory;
wherein the processor is configured to read programs in the memory and perform operations including:
generating pilot configuration information that indicates RE positions corresponding to the pilot signal; controlling the transceiver to transmit the pilot signal to a terminal, and transmitting the pilot configuration information to the terminal, thereby enabling the terminal to receive the pilot signal according to the pilot configuration information;
wherein the transceiver is configured to receive and transmit data under control of the processor; and
the memory is configured to store data used by the processor when performing the operations.

17. A terminal for transmitting a pilot signal obtained through the pilot signal mapping method of claim 1, the terminal comprising: a processor, a transceiver and a memory;
wherein the processor is configured to read programs in the memory and perform operations including:
receiving, from a base station, pilot configuration information that indicates an RE position corresponding to a pilot signal,
receiving and measuring the pilot signal transmitted from the base station according to the pilot configuration information; and
wherein the transceiver is configured to receive and transmit data under control of the processor; and
the memory is configured to store data used by the processor when performing the operations.

* * * * *